United States Patent
Lysenko et al.

(10) Patent No.: US 9,352,969 B2
(45) Date of Patent: May 31, 2016

(54) PROCESS FOR MANUFACTURING SILICON-BASED NANOPARTICLES FROM METALLURGICAL-GRADE SILICON OR REFINED METALLURGICAL-GRADE SILICON

(75) Inventors: Volodymyr Lysenko, Villeurbanne (FR); Jed Kraiem, Bourgoin Jallieu (FR); Mahdi Medjaoui, Argenteuil (FR)

(73) Assignees: INSTITUT NATIONAL des SCIENCES APPLIQUEES DE LYON, Villeurbanne (FR); CENTRE NATIONAL DE LA RECHERCHE SCIENTIFIQUE, Paris (FR); APOLLON SOLAR, Lyons (FR)

( * ) Notice: Subject to any disclaimer, the term of this patent is extended or adjusted under 35 U.S.C. 154(b) by 134 days.

(21) Appl. No.: 14/004,018

(22) PCT Filed: Mar. 9, 2012

(86) PCT No.: PCT/EP2012/054124
§ 371 (c)(1),
(2), (4) Date: Sep. 9, 2013

(87) PCT Pub. No.: WO2012/120117
PCT Pub. Date: Sep. 13, 2012

(65) Prior Publication Data
US 2013/0341234 A1  Dec. 26, 2013

(30) Foreign Application Priority Data

Mar. 9, 2011  (FR) ...................... 11 51926

(51) Int. Cl.
*C01B 33/021* (2006.01)
*C01B 3/10* (2006.01)
*C25B 3/12* (2006.01)
*B82Y 30/00* (2011.01)
(Continued)

(52) U.S. Cl.
CPC ............... *C01B 33/021* (2013.01); *B82Y 30/00* (2013.01); *B82Y 40/00* (2013.01); *C01B 3/10* (2013.01); *C25F 3/12* (2013.01); *B82Y 99/00* (2013.01)

(58) Field of Classification Search
CPC ........................................... C25F 3/12
See application file for complete search history.

(56) References Cited

U.S. PATENT DOCUMENTS 4,124,410 A * 11/1978 Kotval et al. ............... 136/258
5,445,718 A *  8/1995 Wang ........................ 205/646
(Continued)

FOREIGN PATENT DOCUMENTS

FR  2 858 313 A1  2/2005
JP  04059601 A *  2/1992
(Continued)

OTHER PUBLICATIONS

Kareh et al., "Electrochemical properties of metallurgical-grade silicon in hydrochloric acid," *Electrochimica Acta*, 2009, pp. 6548-6553, vol. 54, Elsevier Ltd.
(Continued)

*Primary Examiner* — Nicholas A Smith
(74) *Attorney, Agent, or Firm* — Oliff PLC

(57) ABSTRACT

A process for manufacturing silicon-based nanoparticles by electrochemical etching of a substrate, wherein the substrate is a metallurgical-grade or upgraded metallurgical-grade silicon, the substrate including an impurity content greater than 0.01%.

15 Claims, 1 Drawing Sheet

(51) Int. Cl.
*B82Y 40/00* (2011.01)
*C25F 3/12* (2006.01)
*B82Y 99/00* (2011.01)

(56) References Cited

U.S. PATENT DOCUMENTS

| | | |
|---|---|---|
| 2003/0178571 A1 | 9/2003 | Nayfeh et al. |
| 2004/0197255 A1 | 10/2004 | Nayfeh et al. |
| 2005/0042165 A1* | 2/2005 | Akiyama ............ C01B 3/0005 423/648.1 |
| 2007/0202029 A1* | 8/2007 | Burns et al. .............. 423/324 |
| 2009/0175985 A1 | 7/2009 | Canham |
| 2010/0148144 A1 | 6/2010 | Britton et al. |
| 2010/0178565 A1* | 7/2010 | Green ................... 429/231.95 |
| 2010/0196435 A1 | 8/2010 | Freeman et al. |

FOREIGN PATENT DOCUMENTS

| | | |
|---|---|---|
| JP | 2005-285380 A | 10/2005 |
| JP | 2008-019113 A | 1/2008 |
| JP | 2009-502157 A | 1/2009 |
| JP | 2010-533198 A | 10/2010 |
| WO | WO 97/06550 A1 | 2/1997 |

OTHER PUBLICATIONS

Korotcenkov et al., "Silicon Porosification: State of the Art," *Critical Reviews in Solid State and Materials Science*, 2010, pp. 153-260, vol. 35, Taylor and Francis Group, LLC.

Douani et al., "Silver-assisted electroless etching mechanism of silicon," *Physica Status Solidi (a)*, 2008, pp. 225-230, vol. 205, No. 2, WILEY-VCH Verlag GmbH & Co. KGaA, Weinheim.

Hadjersi et al., "Metal-assisted chemical etching in HF / $Na_2S_2O_8$ or HF / $KMnO_4$ produces porous silicon," Thin Solid Films, 2004, pp. 271-275, vol. 459, Elsevier B.V.

Li et al., "Metal-assisted chemical etching in $HF/H_2O_2$ produces porous silicon," Applied Physics Letters, 2000, pp. 2572-2574, vol. 77, No. 16, American Institute of Physics.

Goryachev et al., "Formation of Thick Porous Silicon Layers with Insufficient Minority Carrier Concentration," Semiconductors, 2004, vol. 38, pp. 712-716.

Oct. 9, 2015 Office Action issued in Japanese Application No. 2013-557113.

\* cited by examiner

PROCESS FOR MANUFACTURING SILICON-BASED NANOPARTICLES FROM METALLURGICAL-GRADE SILICON OR REFINED METALLURGICAL-GRADE SILICON

BACKGROUND

The present invention relates to the manufacturing of silicon-based nanopowders/nanoparticles.

Such silicon-based nanopowders/nanoparticles can have different applications. They are for example used in the field of counterfeiting, as identification means for the marking of objects, in the field of energy for the storage and the production of hydrogen, or in photovoltaics for the manufacturing of 3rd-generation solar cells.

BACKGROUND OF THE INVENTION

Different processes for manufacturing silicon-based nanostructures by chemical or electrochemical etching of a silicon substrate are known. Document [G. Korotcenkov, B. K. Cho, Crit. Rev. Solid State & Mat. Sci., vol. 35, 2010, pp. 153-260] describes an example of process for manufacturing silicon-based nanostructures.

An example of process for manufacturing silicon nanoparticles comprises introducing a single-crystal silicon wafer plunged into a hydrofluoric acid bath having an anode and a cathode arranged therein. A current is applied and a chemical reaction occurs, which results in the forming of pores in the silicon substrate. In parallel, the silicon nanostructures hydrogenate. Afterwards, it is sufficient to mill the porosified substrate to recover the hydrogenated nanopowder. An oxidation reaction due to water, for example, or a thermal activation, enables to release the hydrogen contained in the nanopowder.

However, those skilled in the art can list several limitations in the previously-described process:
- the first one relates to the relatively high energy consumption of the nanostructure manufacturing process,
- the second one relates to the significant amount of energy necessary to release the hydrogen.

The present invention aims at decreasing the energy consumption of the process and thus at increasing the cost-effectiveness of processes for manufacturing silicon-based nanoparticles and at decreasing the activation energy necessary to release the hydrogen contain in the nanopowders to make the nanopowder more efficient.

SUMMARY OF THE INVENTION

For this purpose, the invention provides a process for manufacturing silicon-based nanopowders, characterized in that it comprises the electrochemical etching of substrates of metallurgical-grade or upgraded metallurgical-grade Si comprising an impurity content greater than 10 ppm by weight.

For example, the invention may relate to a process for manufacturing silicon-based nanoparticles by electrochemical etching of a substrate remarkable in that the substrate is obtained from a metallurgical-grade or upgraded metallurgical-grade silicon, the metallurgical-grade or upgraded metallurgical-grade silicon comprising an impurity content greater than 0.001%, said impurities comprising at least boron, phosphorus, calcium, and aluminum.

Three types of elementary silicon can be distinguished according to their impurity contents:
- metallurgical-grade or upgraded metallurgical-grade silicon, having an impurity content greater than 0.001%,
- solar-grade silicon, having an impurity content ranging between 0.001% and 0.000001%, and
- microelectronic-grade silicon, having an impurity content lower than 0.000001%.

The present invention provides the use of metallurgical-grade or upgraded metallurgical-grade silicon to manufacture silicon-based nanopowders.

The inventors have discovered that the use of metallurgical-grade or upgraded metallurgical-grade silicon enables to decrease the amount of energy necessary for the manufacturing of nanopowders due to the presence of a strong concentration of impurities and of a density of structural defects in the substrate, which enable to decrease the substrate anodization voltage.

Further, the use of metallurgical-grade or upgraded metallurgical-grade silicon enables to decrease manufacturing costs in the process, metallurgical-grade or upgraded metallurgical-grade silicon being less expensive than solar- or microelectronic-grade silicon.

The process according to the invention has the following preferred non-limiting aspects:
- the substrate comprises boron, the boron concentration being greater than or equal to 5 ppm by weight, preferably greater than 50 ppm by weight;
- the impurities comprise at least aluminum, iron, calcium, phosphorus, and boron;
- the concentration of each aluminum, iron, calcium, phosphorus, and boron impurity ranges between 1 and 10,000 ppm by weight;
- the substrate comprises:
  - doping impurities such as boron, phosphorus, and aluminum,
  - metallic impurities such as iron, copper, titanium, nickel, chromium, and tungsten,
  - structural defects such as dislocations and grain boundaries with a density $>10^4$ defects/cm$^2$;
- the electric current used for the electrochemical etching of the substrate is a pulsed electric current;
- the electric current density used for the electrochemical etching of the substrate ranges between 1 mA/cm$^2$ and 1 A/cm$^2$, preferably ranging between 1 mA/cm$^2$ and 500 mA/cm$^2$, preferably ranging between 1 mA/cm$^2$ and 250 mA/cm$^2$;
- the process may further comprise a step of backside doping of the substrate, the backside doping step comprising the sub-steps of:
  - depositing aluminum on the back side of the substrate to obtain a substrate comprising an aluminum layer, and
  - annealing the substrate comprising the aluminum layer;
- the thickness of the aluminum layer ranges between 10 nm and 10 µm;
- the process further comprises a step of removing the aluminum layer after the anneal step;
- the process further comprises a step of front-side doping of the substrate comprising illuminating the front side of the substrate by means of a source of white light generating a luminous radiation.

The inventors have also discovered that the use of metallurgical-grade silicon enables to decrease the amount of energy necessary to release the hydrogen contained in the nanopowder originating from this metallurgical-grade or upgraded metallurgical-grade silicon due to the presence of a high concentration of impurities and of a high density of structural defects, which enable to decrease the activation energy.

The invention also relates to silicon-based nanopowders comprising an impurity content >10 ppm by weight (comprising at least 1 ppm by weight of boron, phosphorus, iron, aluminum, and calcium).

Silicon-based nanopowders obtained by the process according to the invention can be distinguished from nanopowders obtained by prior art processes especially by the presence of more types of impurities, the different types of impurities being present by a greater quantity.

The silicon-based nanopowders according to the invention have the following preferred non-limiting aspects:
- the boron concentration is greater than or equal to 5 ppm by weight, preferably greater than 50 ppm by weight, and more preferably still greater than 100 ppm by weight;
- the impurities comprise at least aluminum, iron, calcium, phosphorus, and boron;
- the nanopowders may further comprise at least one of the following impurities: titanium, chromium, copper, molybdenum, nickel, vanadium;
- the impurities are present by the following proportions:
    - Quantity of aluminum ranging between 1 and 5,000 ppm by weight, preferably between 5 and 20 ppm by weight,
    - Quantity of calcium ranging between 1 and 5,000 ppm by weight, preferably between 5 and 20 ppm by weight,
    - Quantity of iron ranging between 1 and 5,000 ppm by weight, preferably between 20 and 80 ppm by weight,
    - Quantity of boron ranging between 5 and 5,000 ppm by weight, preferably between 100 and 800 ppm by weight,
    - Quantity of phosphorus ranging between 1 and 5,000 ppm by weight, preferably between 100 and 800 ppm by weight.

The invention also relates to the use of silicon-based nanoparticles/nanopowders such as described hereabove for the production of hydrogen.

The inventors have indeed discovered that although the impurities present in the nanoparticles significantly influence the mechanical, electric, and other properties of silicon-based nanoparticles, the affinity of silicon-based nanoparticles for hydrogen is little impacted by the presence of such impurities. Conversely, they have even observed that the presence of these impurities enables to decrease the amount of energy necessary to release the hydrogen.

The invention also relates to silicon-based nanopowders having a hydrogen release energy lower than the energy necessary to release the hydrogen of a nanopowder obtained with electronic- or solar-grade silicon due to the presence of impurities by a greater concentration.

BRIEF DESCRIPTION OF THE DRAWINGS

Other features and advantages of the present invention will be discussed in detail in the following non-limiting description of specific examples, in connection with the accompanying drawings, that is, FIGS. 1 to 3, which illustrate different examples of processes for manufacturing silicon-based nanoparticles from a metallurgical-grade silicon substrate.

DETAILED DESCRIPTION

1. Nanoparticle Manufacturing Process

Figure 1:
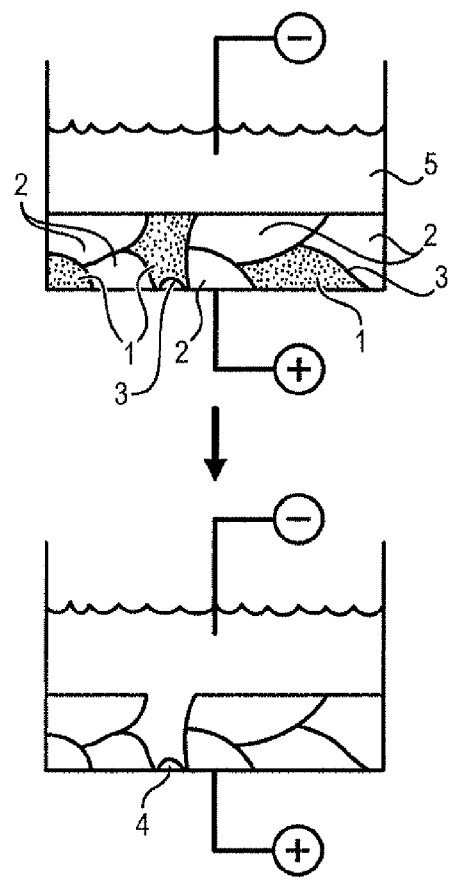

Silicon does not exist naturally in its free state on Earth, but it is very abundant in the form of oxides, for example, silica or silicates. The silicon is obtained by carbothermic reduction of the silica in an arc furnace, that is, by metallurgical processes, and its purity level depends on the purification processing operations that will be applied thereto downstream. Three silicon purity levels can be distinguished:
- metallurgical-grade silicon (known as "MG-Si") directly obtained after the carbothermic reduction of silica (purity ranging from 98 to 99.9%, that is, an impurity content >1,000 ppm by weight.)
- solar-grade silicon (known as "SoG-Si") generally obtained from MG-Si by gas-phase chemical processes such as the simplified Siemens process (purity greater than 99.9999%, that is, an impurity content of approximately 1 ppm by weight),
- electronic-grade silicon (known as "EG-Si"), also obtained by gas-phase chemical processes, which are more complex in order to reach a higher purity level (99.9999999% purity, that is, an impurity content of approximately 1 ppb).

There also exist other sub-classes of silicon such as upgraded metallurgical-grade silicon (or "UMG-Si") which is obtained from metallurgical-grade silicon which has been submitted to additional purification processing operations by successive metallurgical processes (slag refining, segregations, etc. . . . ). Such a succession of metallurgical processes provides a silicon having a purity greater than MG-Si and lower than that of solar-grade Si (SoG). Typically, upgraded metallurgical-grade silicon has a purity on the order of 99.99% (that is, an impurity content of approximately 100 ppm by weight), possibly on the order of 99.999% (that is, an impurity content of approximately 10 ppm by weight).

Such a metallurgical-grade or upgraded metallurgical-grade silicon is then shaped in the form of multi-crystalline ingots (mc-Si). Multi-crystalline silicon ingots are formed in a crucible, generally made of silica, covered on its internal walls with a silicon nitride layer. Such a $Si_3N_4$ deposit is a release agent, it avoid for liquid silicon to stick to the crucible and, at the same time, to generate strain in the silicon block. The crucible loaded with silicon is then placed in a melting furnace, and then taken to 1,430° C. for the melting of silicon, after which it is slowly cooled down to cause the block solidification of the silicon melt.

The obtained block is called multi-crystalline ingot, and is then sawn into bricks and then into wafers by means of a wire saw. The principle of this technique comprises using a steel wire having a diameter on the order of 160 µm delivered by a transmitting coil wound several hundreds of times on four wire guides, thus forming a sheet. The wire, driven at a speed of some ten meters per second, is used as a vehicle for a mixture of oil and abrasive agent (SiC particles) or of polyethylene glycol (PEG) and abrasive agent (also called "slurry") poured on the sheet, which cuts and laps the silicon block which crosses the sheet. Other more modern saws use a diamond wire, that is, a wire having diamond grains fixed thereon, which enables to saw at greater speed. Due to this process, wafers of variable thickness can easily be obtained.

Other processes enable to directly obtain multi-crystalline silicon wafers without using a sawing step, for example, a strip solidification. In this case, this last technological option combines the silicon crystallization and shaping steps and has the advantage of minimizing the loss of material due to the sawing. It is obtained by driving a silicon strip on a planar or tubular support from a molten silicon melt.

This is followed by the step of electrochemical etching of the previously-obtained silicon wafers.

Existing processes for manufacturing silicon nanostructures by electrochemical etching generally use solar-grade, or even electronic-grade silicon to obtain silicon-based nanopowders/nanoparticles.

Indeed, this type of substrate has a homogeneous electric resistivity throughout its entire volume. It is believed by those skilled in the art that a high-purity substrate is necessary in order to have a homogeneous electrochemical etching providing silicon-based nanopowders/nanoparticles.

Based on the knowledge of those skilled in the art, the electrochemical etching of metallurgical-grade silicon should not allow a manufacturing of silicon-based nanopowders/nanoparticles which is reproducible and controlled in terms of nanopowders/nanoparticles functionalities, due to the presence of impurities by a high concentration and to the inhomogeneity (in terms of chemical composition and crystallinity) of metallurgical-grade silicon substrates.

Further, it is assumed by those skilled in the art that the presence of impurities in nanoparticles degrades the physical, mechanical, and electronic properties of such powders, which makes them unsuitable for their known uses.

Thereby, current processes for manufacturing silicon-based nanoparticles generally use high-purity and homogeneous silicon substrates, that is, solar- or electronic-grade silicon substrates.

Now, the energy consumption of the process for manufacturing nanostructures from solar- or electronic-grade Si is relatively high and the quantity of energy necessary to release the hydrogen is also high.

Further, high-purity substrates have a non-negligible cost, which decreases the cost-effectiveness of silicon-based nanoparticle manufacturing processes.

The invention provides a process for manufacturing silicon-based nanoparticles which has a better cost-effectiveness than existing manufacturing processes.

More specifically, the invention provides a process for manufacturing silicon-based nanopowders/nanoparticles from a metallurgical-grade (MG-Si) or upgraded metallurgical-grade (UMG-Si) substrate.

Figure 2:
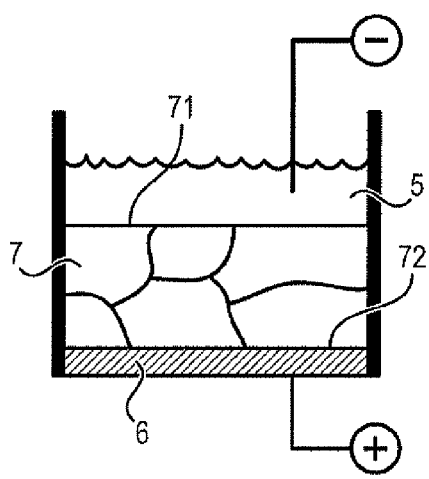

Referring to FIG. 2, a first variation of the process for manufacturing silicon-based nanoparticles has been illustrated, where the nanoparticles are obtained by etching of a metallurgical-grade or upgraded metallurgical-grade silicon substrate 7, preferably bulk.

In the context of the present invention, "metallurgical-grade silicon" means a silicon substrate having an impurity content greater than 0.001%.

In the context of the present invention, "bulk substrate" means any chemical compound mainly formed of silicon atoms (Si) chemically bonded (covalently) together and having at least one linear dimension of its size (height, width, length, diameter, etc.) greater than 1 mm.

Metallurgical-grade or upgraded metallurgical-grade silicon 7 is electrochemically etched. For example, the etching is obtained by an electrochemical etching during which metallurgical-grade or upgraded metallurgical-grade silicon 7 is in contact with an electrolyte 5 comprising at least one acid (hydrofluoric acid, for example).

This substrate conducts an electric current. Etching parameters such as the current density, the chemical composition, the electrolyte concentration, the pressure, and the ambient temperature are selected according to needs (etch rate, porosity, etc.) and will be discussed in further detail hereafter.

Silicon-based nanostructures are thus obtained, the etching parameters being preferentially selected to provide, on milling of these nanostructures, nanoparticles having a size smaller than or equal to 100 nanometers, preferentially smaller than or equal to 50 nanometers, and more preferentially still smaller than or equal to 20 nanometers.

Conversely to the common belief of those skilled in the art relative to the manufacturing of nanoparticles from metallurgical silicon, the inventors have discovered that the presence of a strong concentration of impurities in the metallurgical-grade silicon enables to decrease the substrate anodization voltage, which voltage is applied between the cathode and the anode of the electrochemical cell, which makes the process less energy intensive and thus more cost-effective.

The inventors have also discovered that such a low anodization voltage is due to the presence of a very high concentration of impurities and of structural defects (dislocations, grain boundaries, etc.) in the substrate, thus enabling to decrease the surface resistivity of the substrate.

Indeed, comparing the electrochemical anodization for equivalent conditions of electronic-grade silicon and metallurgical-grade Si wafers, the anodization voltage is much lower in the case of metallurgical Si, which enables to envisage the etching of much thicker wafers without causing any increase of this voltage and thus of the electric power consumed during the etching of one unit thickness of the substrate.

For example, by maintaining the current density at 200 mA/cm$^2$ on a single-crystal Si wafer with no backside ohmic contacts (type p, orientation 100, 500-µm thickness, $\rho$=3 m$\Omega$·cm, 60-cm$^2$ anodization surface), the average value of the anodization voltage is 10.5 V. However, during the etching of the multi-crystal metallurgical Si (type p, random orientation), with a twice greater volume resistance ($\rho$=6 m$\Omega$·cm) and 20 times thicker (1 cm) and still with no backside ohmic contacts, the anodization voltage is lower: 9.5 V (for the same current density and etched surface area values).

This can be explained by a strong decrease of the contact resistances on both interfaces of the anodized substrate (on the electrolyte side and on the dry electrode side of the back side) due to the impurities and to the structural defects present in the metallurgical Si substrate.

Indeed, the presence of impurities at these two interfaces enables to decrease the electric carrier injection energy on the back side or on the anode side and to decrease the activation energy of the electrochemical etching process on creation of the nanopores. It is indeed known that the use of metals (for example: Ag, Al, Fe, Pt, etc.) deposited at the surface of single-crystal Si enables to ease (in certain cases, to make it very efficient) its chemical etching in HF acid in the presence of an oxidizing agent. See, for example, the following papers: a) Douani et al., Phys Stat. Sol A, vol. 205, 2008, p. 225; b) Hadjersi et al., Thin Solid Films, vol. 459, 2004, p. 271; c) Li et al., Appl. Phys. Lett., vol. 77, 2000, p. 2572.

Thus, the higher the concentration of impurities in the metallurgical substrate, the lower the energy necessary to manufacture the nanoparticles, and the less risks there are of forming silicon clusters rather than nanoparticles.

Metallurgical-grade silicon comprises different types of impurities:
  doping impurities such as boron, phosphorus, and aluminum,
  metallic impurities such as iron, copper, titanium, nickel, chromium, and tungsten,
  crystal defects such as dislocations and grain boundaries.

The metallurgical-grade silicon substrate may comprise these different impurities. In the context of the present invention, "comprising an impurity" means comprising a type of impurity by a concentration greater than that of traces, the notion of "traces" designating a content on the order of 1 ppb, preferably on the order of 1 ppm by weight.

Preferably, the silicon substrate used for the manufacturing of nanoparticles comprises at least calcium, iron, phosphorus, aluminum, and boron. The concentration of each aluminum, calcium, phosphorus, and boron impurity may range between 1 and 10,000 ppm by weight.

The boron concentration of the substrate is preferably greater than or equal to 5 ppm by weight, and more preferably still greater than 50 ppm by weight.

To improve the quality of the electrochemical etching of the metallurgical-grade silicon substrate, and in particular that of upgraded metallurgical-grade silicon substrate, since it contains less impurities, the process according to the invention may comprise doping the substrate on at least one of its faces, and especially the back side thereof. The manufacturing process may also comprise the substrate doping on two opposite faces, for example, front and back sides 71 and 72 thereof. Of course, such doping steps, described hereafter in relation with the etching of upgraded metallurgical-grade silicon (UMG-Si) may be applied to the etching of metallurgical-grade silicon (MG-Si).

The doping of the back side and/or of the front side of the substrate enables to homogenize the surface conductivity of the upgraded metallurgical-grade silicon substrate so as to improve the quality of the electrochemical etching of a bulk upgraded metallurgical-grade silicon substrate 7 to obtain silicon-based nanoparticles.

In an embodiment, the backside doping is performed by deposition of an aluminum layer 6 on back side 72 of substrate 7, and anneal of substrate 7 comprising aluminum layer 6. The anneal step enables the aluminum to diffuse across the thickness of upgraded metallurgical-grade silicon substrate 7 to improve the conductivity thereof.

The deposition may be performed by different techniques known by those skilled in the art. For example, the aluminum may also be deposited on substrate 7 by sputtering, or also by an electrolytic deposition technique.

The duration of the anneal step may vary, for example, according to the thickness of the aluminum layer. Preferably, the duration of the anneal step ranges between 1 min and 1 hour.

Front side doping 71 may be performed by different techniques. An embodiment provides an illumination thereof by means of a white light source generating a luminous radiation. In this case, front side 71 of substrate 7 is illuminated all along the electrochemical etching.

The illumination of front side 71 of substrate 7 enables to homogenize the photo-induced resistivity and to ensure the good conductivity of the front side.

The operating principle of an alternative embodiment according to the invention will now be described in further detail.

In a first step, a metal layer 6 such as aluminum is deposited on back side 72 of upgraded metallurgical-grade silicon substrate 7 (optional step).

Substrate 7 comprising aluminum layer 6 is then annealed. During the anneal, the aluminum diffuses within substrate 7. This enables to homogenize the conductivity of substrate 7 on back side 72.

It is possible to remove the aluminum layer after the anneal step. This step depends on the number of substrates which are desired to be electrochemically etched in a same bath.

For example, if a single substrate is desired to be etched, it is not necessary to remove aluminum layer 6: it is possible to arrange substrate 7 horizontally in a hydrofluoric acid bath 5, with no contact between the aluminum surface and the hydrofluoric acid solution, as illustrated in FIG. 2.

Figure 3:
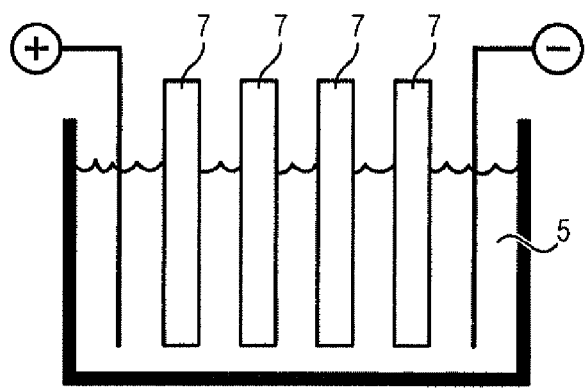

If, however, several substrates are desired to be etched in parallel in the hydrofluoric acid bath, the aluminum layer of each substrate 7 will preferably be removed and the substrates will be arranged vertically in hydrofluoric acid solution 5, as illustrated in FIG. 3.

As described hereabove, the steps of deposition, anneal, and possible removal of the aluminum layer are optional and enable to improve the surface conductivity of the substrate on its back side.

Backside-doped upgraded metallurgical-grade silicon substrate(s) are then arranged in hydrofluoric acid solution 5.

Optionally, front side 71 of substrate(s) 7 is illuminated by using a source of white light such as a lamp emitting a white luminous radiation.

Finally, an electric current is applied in hydrofluoric acid solution 5. The electrochemical etching of substrate 7—possibly doped on both its faces 71, 72—then starts and provides silicon-based nanoparticles.

Once the electrochemical anodization has been performed, a porosified substrate containing silicon nanostructures is available. This substrate is then milled, which provides the silicon-based nanopowder, which is hydrogenated (cf. FR 2 858 313).

Finally, the inventors have also discovered that the use of metallurgical- or upgraded metallurgical-grade silicon enables to decrease the amount of energy necessary to release the hydrogen contained in the hydrogenated nanopowder originating from this metallurgical-grade or upgraded metallurgical-grade silicon due to the presence of a high concentration of impurities and of a high density of structural defects which enable to decrease the activation energy.

Preferably, silicon-based nanopowders comprise an impurity content >10 ppm by weight (for example, at least 1 ppm by weight of boron, phosphorus, iron, aluminum, and calcium). According to an alternative embodiment of the invention, the impurities contained in the nanopowders may comprise boron by a concentration greater than or equal to 5 ppm by weight, preferably greater than 50 ppm by weight, and preferably still greater than 100 ppm by weight. According to another alternative embodiment of the invention, the impurities contained in nanopowders may comprise at least aluminum, iron, calcium, phosphorus, and boron. Further, the nanopowders may comprise at least one of the following impurities: titanium, chromium, copper, molybdenum, nickel, vanadium. In an embodiment of the invention, the nanopowders may comprise the previously-mentioned impurities by the following proportions:

- Quantity of aluminum ranging between 1 and 5,000 ppm by weight,
- Quantity of calcium ranging between 1 and 5,000 ppm by weight,
- Quantity of iron ranging between 1 and 5,000 ppm by weight,
- Quantity of boron ranging between 5 and 5,000 ppm by weight,
- Quantity of phosphorus ranging between 1 and 5,000 ppm by weight.

Silicon-based nanopowders obtained by the process according to the invention can be distinguished from nanopowders obtained by prior art processes especially by the presence of more impurities, by a greater quantity.

Indeed, the presence of metal atoms at the surface of Si is known to catalyze its chemical reactions in acid environments in the presence of oxidizers. It can then be assumed that the oxidation of the metallurgical-grade Si nanopowder in oxidizing environments (more or less basic) enabling to produce hydrogen will be made more efficient by decrease of the time constant characteristic of this reaction due to the presence of the impurities in the metallurgical-grade Si nanopowder.

Different embodiments of the invention and the results obtained by the inventors will now be disclosed.

1. Examples

1.1 Substrate Used

As previously indicated, the metallurgical-grade silicon is obtained industrially by carbothermic reduction of silica in an electric arc furnace. Metallurgical-grade silicon generally contains at last 98% of silicon and, as main elements, iron, aluminum and calcium, titanium. Metallurgical-grade silicon also contains a certain quantity of oxygen, carbon, and other elements, by a content <01%, such as phosphorus, boron, nickel, vanadium, etc.

The types and concentrations of the impurities contained in metallurgical-grade silicon are quite different according to the selected initial quartz, to the reducing agent used (coke, charcoal, hard coal, etc.), and to the processing which follows the casting at the coming out of the arc furnace.

In the different embodiments of the process described hereafter, a metallurgical-grade silicon having the following composition is used:
 Aluminum (Al)=0.237%,
 Boron (B)=57.4 ppm by weight,
 Calcium (Ca)=0.335%,
 Chromium (Cr)=13.3 ppm by weight,
 Copper (Cu)=40.9 ppm by weight,
 Iron (Fe)>0.4%,
 Nickel (Ni)=<2 ppm by weight,
 Phosphorus (P)=23.7 ppm by weight,
 Titanium (Ti)=not measured,
 Vanadium (V)=9.7 ppm by weight,
 Molybdenum (Mo)=<2 ppm by weight,
 Zirconium (Zr)=19.5 ppm by weight.

The metallurgical-grade silicon is then loaded into a silica crucible, placed in a melting/solidification furnace to be melted and crystallized in the form of multi-crystalline ingots. Then, the ingot is cut into bricks and wafers by means of a wire saw.

Further, the characteristics of the cut metallurgical-grade silicon wafers used in the different variations discussed hereafter are the following:
 Resistivity ($\rho$): 5-7 m$\Omega$·cm, of type p, and sometimes with a significant doping difference within the same wafer (measured by the 4-point probes method);
 Dimensions of the Si wafers 70 mm×70 mm×10 mm;
 Crystal orientation: poly-crystalline;
 Unpolished front and back sides.

It should be obvious to those skilled in the art that this example of substrate is by no means limiting and that metallurgical-grade silicon substrates having different compositions may also be used.

These metallurgical-grade silicon wafers are then anodized according to the following embodiments:

1.2 Embodiment 1

Anodization Conditions:
 Stirring: yes normal,
 Electrolyte: HF (48%): ethanol 1:1 by volume,
 Electrolyte recycled: 0 times,
 Current density J=200 mA/cm2,
 I=4.0 A,
 Pulsed current: 999.9 s on: 0.1 s off,
 Initial voltage V0=11.4 V,
 Final voltage Vt=7.4 V,
 Total etching time: 99 min,
 Calculated etch rate=7.5 µm/min,
 Electrode type: Gold,
 Rinsing of the nanoparticles five times with pure ethanol× 5, followed by a washing of the wafer in water and alkali 1% (2 min dipping).

Once anodized, the substrate is milled to obtain the nanopowder.

This first embodiment has provided a mass of nanoparticles equal to 112 mg.

It should be noted that a great number of layers of the initial silicon wafer have been etched, which means that the efficiency of the process can be improved by varying the parameters of the process.

Finally, a large amount of the electrolyte has evaporated, which means that too high a quantity of energy has been provided, which has induced an increase in the electrolyte temperature.

1.3 Embodiment 2

Anodization Conditions:
 Stirring: yes normal,
 Electrolyte: HF (48%): ethanol 1:1 by volume,
 Electrolyte recycled: 0 times,
 J=200 mA/cm2,
 I=4.0 A,
 V0=11.4 V,
 Vt=7.4 V,
 Pulsed current: 1 s on: 1 s off,
 Total time 99 min,
 Calculated etch rate=3.6 µm/min,
 Gold electrode,
 Rinsing: pure ethanol×5, followed by a washing of the wafer in water and alkali 1% (2 min).

Once anodized, the substrate is milled to obtain the nanopowder.

This second embodiment has provided a mass of nanoparticies equal to 192 mg, and thus greater than in the first embodiment.

The metallurgical-grade silicon wafer has been etched across a smaller thickness than for the first embodiment, whereby the efficiency is improved.

Finally, a lower quantity of the electrolyte has evaporated.

1.4 Embodiment 3

Anodization Conditions:
 Stirring: yes normal,
 Electrolyte: HF (48%): ethanol 1:1 by volume,
 Electrolyte recycled: 0 times,
 J=200 mA/cm2,
 I=4.0 A,
 V0=11.4 V,
 Vt=7.4 V,
 Pulsed current: 1 s on: 2 s off,
 Total time 99 min,
 Calculated etch rate=2.9 µm/min,
 Gold electrode,
 Rinsing: pure ethanol×5, followed by a washing of the wafer in water and alkali 1% (2 min).

Once anodized, the substrate is milled to obtain the nanopowder.

This third embodiment has provided a mass of nanoparticles equal to 155 mg.

The metallurgical-grade silicon wafer has been etched across a smaller thickness than for the first embodiment, whereby the efficiency is improved.

Finally, a smaller amount of the electrolyte has evaporated.

2. Conclusion Relative to the Etch Parameters

The three embodiments discussed hereabove, carried out by varying parameters linked to the electric current, provide the following comparative table:

| Rate | Etch rate | powder mass | evaporation |
|---|---|---|---|
| 999.9 s on: 0.1 s off | 7.5 µm/min | 112 mg | + |
| 1 s on: 1 s off | 3.6 µm/min | 192 mg | − |
| 1 s on: 2 s off | 2.9 µm/min | 155 mg | − |

The following can be deduced from these three embodiments:
the use of a pulsed electric current of duty cycle ½, and/or
the use of a pulsed electric current having a cycle ranging between 1 second and 4 seconds, preferably equal to 2 seconds, and/or
enable to improve the efficiency of the etching.

The value of the current density has then been varied to observe the impact of this value on the efficiency obtained at the end of the process.

The following results have been obtained:

| Embodiment | I, A | j, mA/cm$^2$ | m, g |
|---|---|---|---|
| 4 | 1 | 50 | 0.18886 |
| 5 | 2 | 100 | 0.26308 |
| 6? | 3 | 150 | 0.37288 |
| 6? | 5 | 250 | 0.13661 |
| 7 | 6 | 300 | 0.08914 |

The process may be implemented by using a current density ranging between 1 mA/cm$^2$ and 1 A/cm$^2$, preferably ranging between 1 mA/cm$^2$ and 500 mA/cm$^2$, preferentially ranging between 1 mA/cm$^2$ and 250 mA/cm$^2$, and more preferentially still equal to 150 mA/cm$^2$.

It can be observed that for current densities ranging between:
1 and 50 mA/cm$^2$, the etch rate is slow,
250 and 300, the etch rate is high.

The lower the etch rate, the longer the implementation of the process should be in order to obtain a given quantity of nanoparticles.

The higher the etch rate, the more loss there is and thus the more the efficiency of the process decreases, the formed nanoparticles being dissolved as the process advances.

It can be observed that current densities ranging between 100 and 150 mA/cm$^2$ provide a very good compromise between the speed and the nanoparticle output.

3. Composition of the Obtained Nanoparticles

The composition of the nanoparticles obtained from the substrate described at point 2.1 has been analyzed. This composition is:
Aluminum (Al)=10.8 ppm by weight,
Calcium (Ca)=13.3 ppm by weight,
Iron (Fe)=56.8 ppm by weight,
Phosphorus (P)=10 ppm by weight,
Titanium (Ti)=<2 ppm by weight,
Chromium (Cr)=4.5 ppm by weight,
Copper (Cu)=13.8 ppm by weight,
Molybdenum (Mo)=<2 ppm by weight,
Nickel (Ni)=3.5 ppm by weight,
Vanadium (V)=<2 ppm by weight,
Boron (B)=246 ppm by weight,
Manganese (Mn)=<5 ppm by weight.

It should be obvious to those skilled in the art that this composition may vary according to the composition of the initial metallurgical-grade silicon used to implement the process.

In all cases, the silicon-based nanoparticles obtained by electrochemical etching of metallurgical-grade silicon comprise the following impurities: aluminum, calcium, phosphorus, and boron.

Here again, "comprising an impurity" means comprising a type of impurity by a concentration greater than that of traces.

The aluminum, calcium, phosphorus, and boron impurities may for example be present by the following proportions:
Quantity of aluminum ranging between 1 and 5,000 ppm by weight, preferably between 5 and 300 ppm by weight,
Quantity of calcium ranging between 1 and 5,000 ppm by weight, preferably between 5 and 300 ppm by weight,
Quantity of iron ranging between 1 and 5,000 ppm by weight, preferably between 5 and 300 ppm by weight,
Quantity of boron ranging between 5 and 5,000 ppm by weight, preferably between 100 and 800 ppm by weight,
Quantity of phosphorus ranging between 1 and 5,000 ppm by weight, preferably between 100 and 800 ppm by weight.

The boron concentration may be greater than or equal to 5 ppm by weight, preferably greater than 50 ppm by weight, and more preferably still greater than 100 ppm by weight.

The nanopowders may further comprise at least one of the following impurities: phosphorus, titanium, chromium, copper, molybdenum, nickel, vanadium.

4. Example of Possible Use

The inventors have then used the nanoparticles obtained by the process according to the invention to produce hydrogen (H2).

The inventors have thus discovered that even if the impurities present in the nanoparticles significantly influence the mechanical, electric, and other properties of silicon-based nanoparticles, the affinity of silicon-based nanoparticles for hydrogen is little impacted by the presence of such impurities.

The nanoparticles obtained by implementing the process according to the invention can thus be used to produce hydrogen as described in document FR 2 858 313.

In particular, a hydrogen reservoir comprising a substance capable of storing hydrogen may be provided, said substance being formed of the previously-described nanoparticles.

With the process according to the invention, silicon-based nanoparticles are easy to produce by a large quantity and at low cost.

Of course, the above examples are non-limiting specific illustrations only.

For example, the process described hereabove may be implemented by using an upgraded metallurgical-grade silicon substrate of type UMG1 or UMG2.

The invention claimed is:
1. A process for manufacturing hydrogen via silicon-based nanopowders, comprising:
providing a substrate made of metallurgical-grade silicon or upgraded metallurgical-grade silicon having an impurity content greater than 10 ppm by weight, electrochemically etching said substrates to form silicon-based nanopowders having a hydrogen release energy lower than the hydrogen release energy of a silicon nanopowder obtained from electronic- or solar-grade silicon, and producing hydrogen via the silicon-based nanopowders.

2. The process according to claim 1, wherein the substrate comprises a boron content greater than or equal to 5 ppm by weight.

3. The process according to claim 1, wherein the substrate comprises a boron content greater than 50 ppm by weight.

4. The process according to claim 1, wherein the impurity content comprises an aluminum content, iron content, calcium content, phosphorus content, and boron content.

5. The process according to claim 4, wherein the aluminum content, iron content, calcium content, phosphorus content, and boron content each range between 1 and 10,000 ppm by weight.

6. The process according to claim 1, wherein the substrate further comprises copper, titanium, nickel, chromium, and tungsten.

7. The process according to claim 1, wherein the substrate further comprises structural defects with a density greater than $10^4$ defects/cm$^2$.

8. The process according to claim 1, wherein the electrochemical etching is performed by pulsed electric current.

9. The process according to claim 1, wherein the electrochemical etching is performed by an electric current comprised between 1 mA/cm$^2$ and 1 A/cm$^2$.

10. The process according to claim 9, wherein the electrochemical etching is performed by an electric current comprised between 1 mA/cm$^2$ and 500 mA/cm$^2$.

11. The process according to claim 10, wherein the electrochemical etching is performed by an electric current comprised between 1 mA/cm$^2$ and 250 mA/cm$^2$.

12. The process according to claim 1, further comprising:
    forming an aluminum layer on a backside of the substrate,
    annealing the substrate comprising the aluminum layer for doping the substrate.

13. The process according to claim 12, wherein a thickness of the aluminum layer ranges between 10 nm and 10 μm.

14. The process according to claim 12, further comprising removing the aluminum layer after annealing the substrate.

15. The process according to claim 1, further comprising:
    illuminating a front side of the substrate opposite a backside of the substrate by means of a source of white light generating a luminous radiation for doping the substrate.

* * * * *